United States Patent
Hirose et al.

(10) Patent No.: US 7,399,094 B2
(45) Date of Patent: Jul. 15, 2008

(54) POLYGON MIRROR AND POLYGON MIRROR MOLDING DIE

(75) Inventors: Kazuya Hirose, Kamiina-gun (JP);
Kenji Haga, Kamiina-gun (JP); Isao Tsubouchi, Suwa (JP); Toru Takahashi, Kamiina-gun (JP); Katsuaki Yakata, Matsumoto (JP); Fumito Orii, Chino (JP)

(73) Assignee: Olympus Corporation, Tokyo (JP)

( * ) Notice: Subject to any disclaimer, the term of this patent is extended or adjusted under 35 U.S.C. 154(b) by 337 days.

(21) Appl. No.: 11/242,112

(22) Filed: Sep. 28, 2005

(65) Prior Publication Data

US 2006/0023281 A1    Feb. 2, 2006

Related U.S. Application Data (63) Continuation of application No. PCT/JP05/01141, filed on Jan. 27, 2005.

(30) Foreign Application Priority Data

Jan. 30, 2004    (JP)    ............... 2004-024337

(51) Int. Cl.
*G02B 5/08*    (2006.01)
(52) U.S. Cl. .................. 359/855; 359/216; 359/850; 425/573
(58) Field of Classification Search ............. 359/850, 359/855
See application file for complete search history.

(56) References Cited

U.S. PATENT DOCUMENTS

| | | | |
|---|---|---|---|
| 4,902,085 A | 2/1990 | Murakoshi et al. | |
| 5,296,959 A | 3/1994 | Asai | |
| 5,581,416 A * | 12/1996 | Asai | ............................. 359/855 |

FOREIGN PATENT DOCUMENTS

| | | | |
|---|---|---|---|
| JP | 63-304225 A | 12/1988 |
| JP | 4-253021 A | 9/1992 |
| JP | 5-60995 A | 3/1993 |
| JP | 8-238682 A | 9/1996 |
| JP | 2619244 A | 3/1997 |
| JP | 10-186116 A | 7/1998 |

* cited by examiner

OTHER PUBLICATIONS

Notification of Transmittal of Copies of Translation of the International Preliminary Report on Patentability, Chapter I or Chapter II of the Patent Cooperation Treaty, and Written Opinion of the International Searching Authority, for PCT/JP2005/001141, 6 sheets, Aug. 22, 2006.

*Primary Examiner*—James Phan
(74) *Attorney, Agent, or Firm*—Frishauf, Holtz, Goodman & Chick, P.C.

(57) ABSTRACT

A polygon mirror includes a reflective surface group having n number of reflective surfaces (M(1), ..., M(n)) formed individually as outer peripheral side faces, a flat portion which shuts one end portion of the reflective surface group, and n number of pin gate traces (L(1), ..., L(n)) which are provided on the flat portion, correspond to the n number of reflective surfaces, individually, and are kept individually at distances from edge portions at which the reflective surfaces cross the flat portion. There are conditions $DM(1)>DL(1)/2, ..., DM(n)>DL(n)/2$ and $DM(1)>DL(n)/2, ..., DM(n)>DL(n-1)/2$, where $DM(n)$ is a shortest distance from an edge portion at which the reflective surface $M(n)$ and the flat portion cross each other to the pin gate trace $L(n)$ and $DL(n)$ is a shortest distance between the pin gate trace $L(n)$ and the pin gate trace $L(1)$.

17 Claims, 10 Drawing Sheets

POLYGON MIRROR AND POLYGON MIRROR MOLDING DIE

CROSS REFERENCE TO RELATED APPLICATIONS

This is a Continuation Application of PCT Application No. PCT/JP2005/001141, filed Jan. 27, 2005, which was published under PCT Article 21(2) in Japanese.

This application is based upon and claims the benefit of priority from prior Japanese Patent Application No. 2004-024337, filed Jan. 30, 2004, the entire contents of which are incorporated herein by reference.

BACKGROUND OF THE INVENTION

1. Field of the Invention

The present invention relates to a polygon mirror molded by injection molding and a molding die used to mold the same.

2. Description of the Related Art

A polygon mirror, which switches or scans reflected light by rotating, is provided with a plurality of reflective surfaces. The polygon mirror is molded by injection molding using a die. A polygon mirror manufacturing method is described in, for example, Jpn. Pat. Appln. KOKAI Publication No. 8-238682 and Jpn. Pat. No. 2619244.

Figure 10:
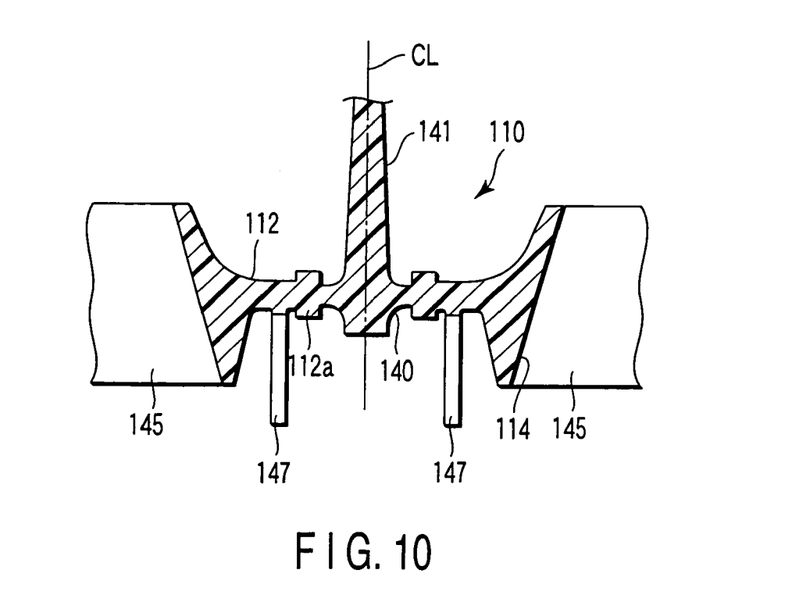
FIG. 10 is a sectional view showing a conventional polygon mirror molding method.

FIG. 10 illustrates the manufacturing method described in Jpn. Pat. Appln. KOKAI Publication No. 8-238682.

A polygon mirror 110 includes a flat portion 112 and a plurality of reflective surfaces 114 that are coupled to the flat portion 112 so as to be arranged individually on its outer peripheral side faces. The flat portion 112 is coupled to an intermediate portion of the reverse side of each reflective surface 114. An annular boss portion 112a in which a rotating body is mounted is formed in the central part of the flat portion 112.

A die for injecting the polygon mirror 110 of this type includes a sprue 141 and a disc gate 140 that extends horizontally from a terminal end of the sprue 141. The sprue 141 extends along a rotation axis CL of the polygon mirror 110 to be molded. Numeral 145 denotes a sliding die for molding the reflective surfaces 114 of the polygon mirror 110.

In molding the polygon mirror 110, a molten resin material is injected to the sprue 141 under a given pressure. After the resin material is filled into a cavity of the die through the disc gate 140, the die is cooled to solidify the resin material. Thereafter, the die is opened, and a molded piece is ejected by an ejector pin 147, whereupon the injection molding terminates.

After the molding, the disc gate 140 is removed, whereupon an annular boss portion 112a is formed. The inner surface of the boss portion 112a serves as a mounting surface for the rotating body. In filling the resin material with this structure, the resin material is fed radially outward at a time from the rotation axis CL in the central part, so that weld lines cannot be easily produced.

Figure 11A:
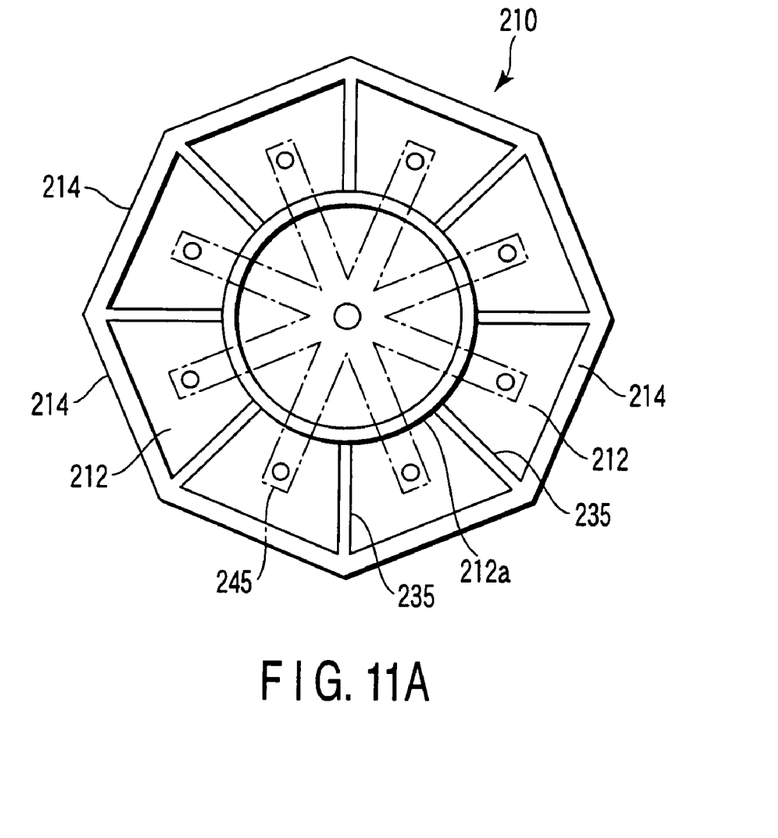
FIG. 11A is a plan view showing another conventional polygon mirror molding method.
Figure 11B:
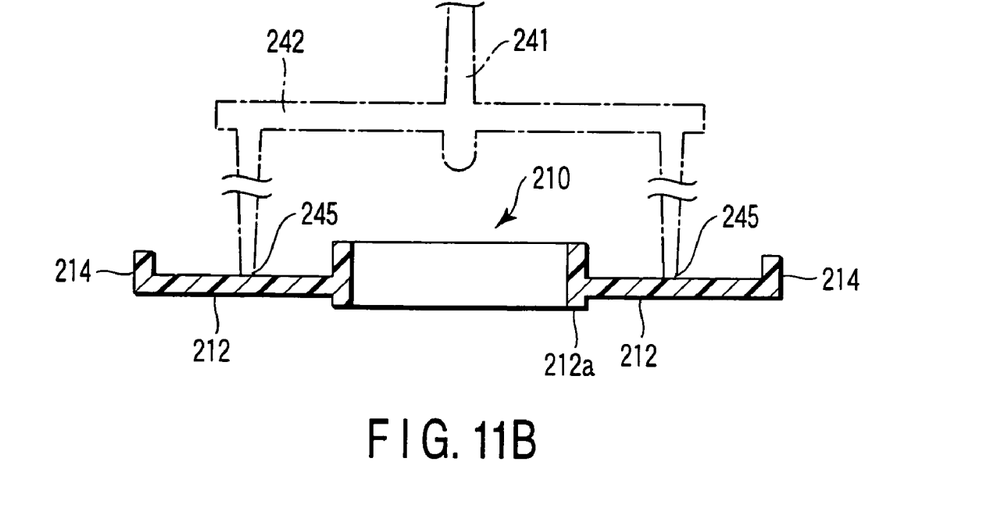
FIG. 11B is a sectional view showing another conventional polygon mirror molding method.

FIGS. 11A and 11B illustrate the manufacturing method described in Jpn. Pat. No. 2619244.

A polygon mirror 210 includes a boss portion 212a, plate-like portions 212, and reflective surfaces 214. The boss portion 212a is formed in the central part and serves as a mounting portion for a rotating body. A plurality of (e.g., eight) plate-like portions 212 extend radially from the boss portion 212a. The reflective surfaces 214 are formed individually on the respective distal ends of the plate-like portions 212 that extend from the boss portion 212a. A die is provided with a cavity that forms the boss portion 212a, plate-like portions 212, and reflective surfaces 214.

In order to fill a molten resin material into the cavity of the die, a sprue 241 extends corresponding to the central part of the boss portion 212a, as shown in FIG. 11B. Runners 242 extend radially from the sprue 241. The runners 242 extend corresponding to the plate-like portions 212, individually. The respective distal end portions of the runners 242 serve individually as pin gates 245 through which the resin material is fed into the cavity. The pin gates 245 as many as the reflective surfaces 214 are provided corresponding to the reflective surfaces 214, individually. The pin gates 245 are arranged substantially in the central part with respect to the transverse direction of the plate-like portions 212. Thus, the pin gates 245 are located individually on bisectors perpendicular to their corresponding reflective surfaces 214.

With this construction, the amount of the resin material injected through each pin gate 245 and the balance of pressure are fixed. The respective entire areas of the reflective surfaces 214 are located at substantially equal distances from the pin gates 245. Therefore, the molten resin material flows uniformly and spreads equally. Thus, weld lines formed between the adjacent reflective surfaces 214 are produced along ridges 235 (FIG. 11A) or boundaries between the plate-like portions 212, and weld lines on the reflective surfaces 214 can be prevented from being produced.

BRIEF SUMMARY OF THE INVENTION

According to one aspect of the present invention, there is provided a polygon mirror includes a reflective surface group having n number of reflective surfaces (M(1), . . . , M(n)) formed individually as outer peripheral side faces, a flat portion which shuts one end portion of the reflective surface group, and n number of pin gate traces (L(1), . . . , L(n)) which are provided on the flat portion, correspond to the n number of reflective surfaces, individually, and are kept individually at distances from edge portions at which the reflective surfaces cross the flat portion. There are conditions DM(1)>DL(1)/2, . . . , DM(n)>DL(n)/2 and DM(1)>DL(n)/2, . . . , DM(n)>DL(n−1)/2, where DM(n) is a shortest distance from an edge portion at which the reflective surface M(n) and the flat portion cross each other to the pin gate trace L(n) and DL(n) is a shortest distance between the pin gate trace L(n) and the pin gate trace L(1).

According to one aspect of the present invention, there is provided a polygon mirror molding die for molding a polygon mirror, which includes a reflective surface group having n number of reflective surfaces (M(1), M(2), . . . , M(n)) formed individually as outer peripheral side faces and a flat portion which shuts one end portion of the reflective surface group, characterized by including: n number of pin gates (L(1), L(2), . . . , L(n)) which are provided on a flat portion molding surface for molding the flat portion, correspond to the n number of reflective surfaces, individually, and are kept individually at distances from edge portions at which the n number of reflective surfaces cross the flat portion. There are conditions DM(1)>DL(1)/2, DM(2)>DL(2)/2, . . . , DM(n)>DL(n)/2 and DM(1)>DL(n)/2, DM(2)>DL(1)/2, . . . , DM(n)>DL(n−1)/2, where DM(1) is a shortest distance from an edge portion at which the reflective surface M(1) and the flat portion cross each other to the pin gate L(1), DM(2) is a shortest distance from an edge portion at which the reflective surface M(2) and the flat portion cross each other to the pin gate L(2), . . . , DM(n) is a shortest distance from an edge portion at which the reflective surface M(n) and the flat portion cross each other to the pin gate L(n), DL(1) is a shortest distance between a shortest distance between the pin gate L(1) and the pin gate L(2), DL(2) is a shortest distance between the pin gate L(2) and the pin gate L(3), . . . , and DL(n) is a shortest distance between the pin gate L(n) and the pin gate L(1).

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The best mode for carrying out the invention will now be described with reference to the drawings.

First, a first embodiment will be described with reference to FIGS. 1 to 5.

Figure 1:
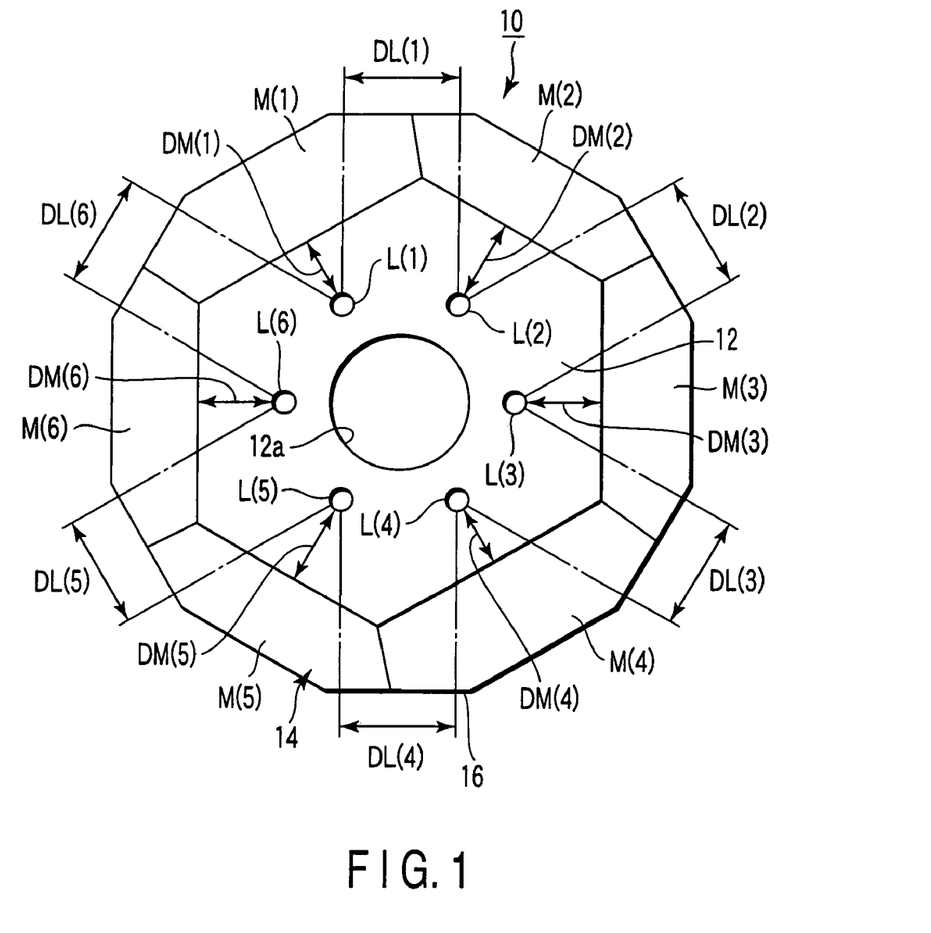
FIG. 1 is a schematic plan view showing a polygon mirror according to a first embodiment of the present invention.

A polygon mirror 10 is mounted on a rotating shaft of, e.g., a barcode scanner, laser beam printer, vehicular optical scanner, etc. when it is used. Reflected light can be switched or scanned by rotating the polygon mirror 10 around the given rotating shaft.

The polygon mirror 10 is formed by injection-molding, for example, a thermoplastic resin material. The thermoplastic resin material may be, for example, polycarbonate, methacrylic resin, polyarylate, polystyrene, cycloolefin polymer, or other suitable resin material. For example, "ZEONEX 480S" (trade name, ZEON Corporation) may be used as the cycloolefin polymer.

As shown in FIG. 1, the polygon mirror 10 includes a plate-like flat portion 12 mounted on a rotating body and a tubular reflective surface group 14 formed on an edge portion of the flat portion 12. The flat portion 12 is formed so that shut one end portion (upper end portion in FIG. 1) of the reflective surface group 14.

The reflective surface group 14 is formed in the shape of a square pillar (prism) such that reflective surfaces M(1), M(2), M(3), M(4), M(5) and M(6) (mentioned later) cross at right angles to the flat portion 12 or substantially in the shape of an umbrella such that the reflective surfaces M(1) to M(6) are inclined at other than right angles to the flat portion 12. Thus, although the reflective surfaces M(1) to M(6) are formed in the shape of an umbrella such that they are inclined diagonally outward from the flat portion 12, in the configuration shown in FIG. 1, they may be formed hanging vertically from the flat portion 12. Further, the angles of the reflective surfaces M(1) to M(6) to their respective adjacent surfaces may be different or equal.

Preferably, the reflective surface group 14 should be provided with a plurality of (or n number of) reflective surfaces M. In the description herein, it is supposed to be provided with the six reflective surfaces M(1) to M(6), for example.

These reflective surfaces M(1) to M(6) are formed severally or equally of suitable surfaces, such as flat surfaces, spherical surfaces, aspherical surfaces, rotationally symmetric aspherical surfaces, free curved surfaces, etc. A thin metallic film of aluminum, silver, or gold is put on the outer surface of each of the reflective surfaces M(1) to M(6) to form a specular surface by vapor deposition, sputtering, etc. If light is applied to the reflective surfaces M(1) to M(6), therefore, it is reflected by the reflective surfaces M(1) to M(6).

Figure 2:
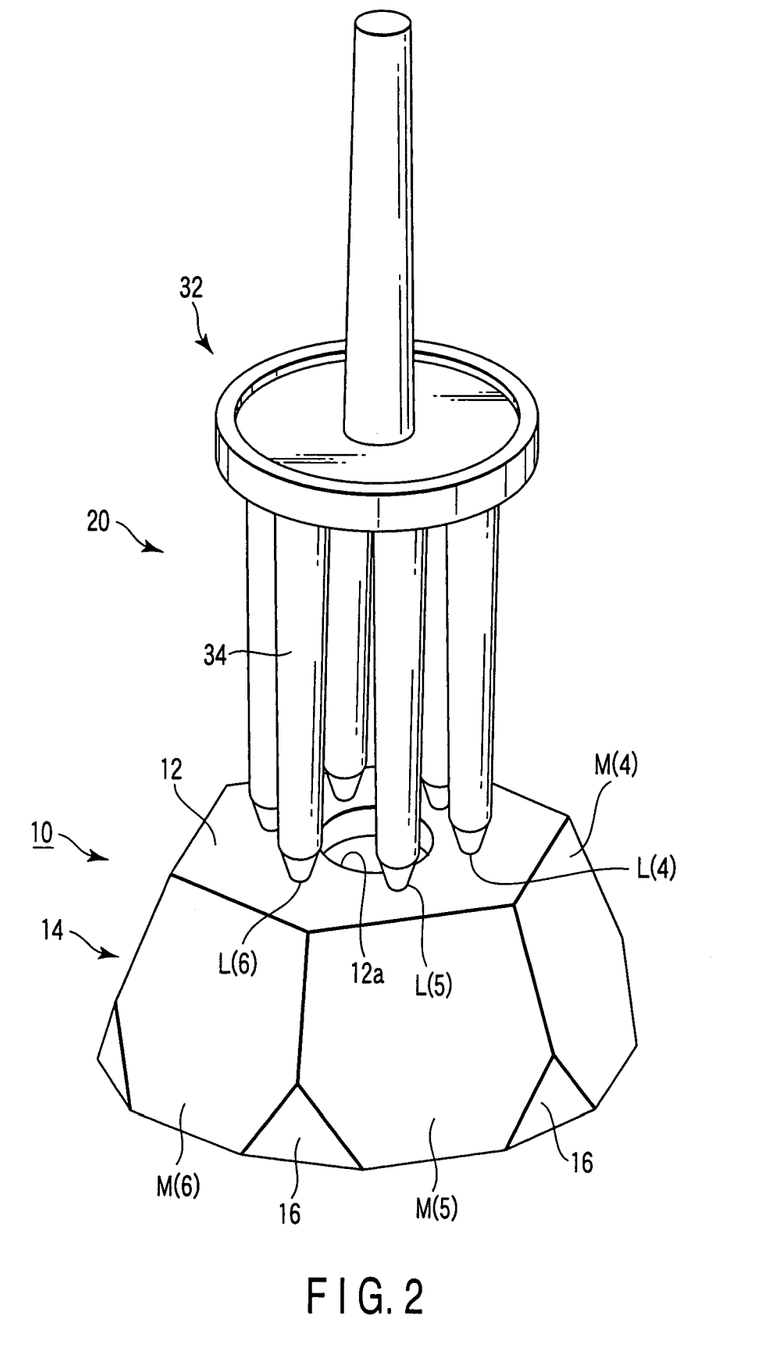
FIG. 2 is a schematic perspective view showing a molded piece for molding the polygon mirror according to the first embodiment.

As shown in FIG. 2, triangular chamfer portions 16 are formed individually on the underside portions of the reflective surfaces M(1) to M(6). These chamfer portions 16 are arranged individually between the adjacent reflective surfaces M(1) to M(6). In many cases, however, they are not used optically, so that they may be omitted.

Figure 3:
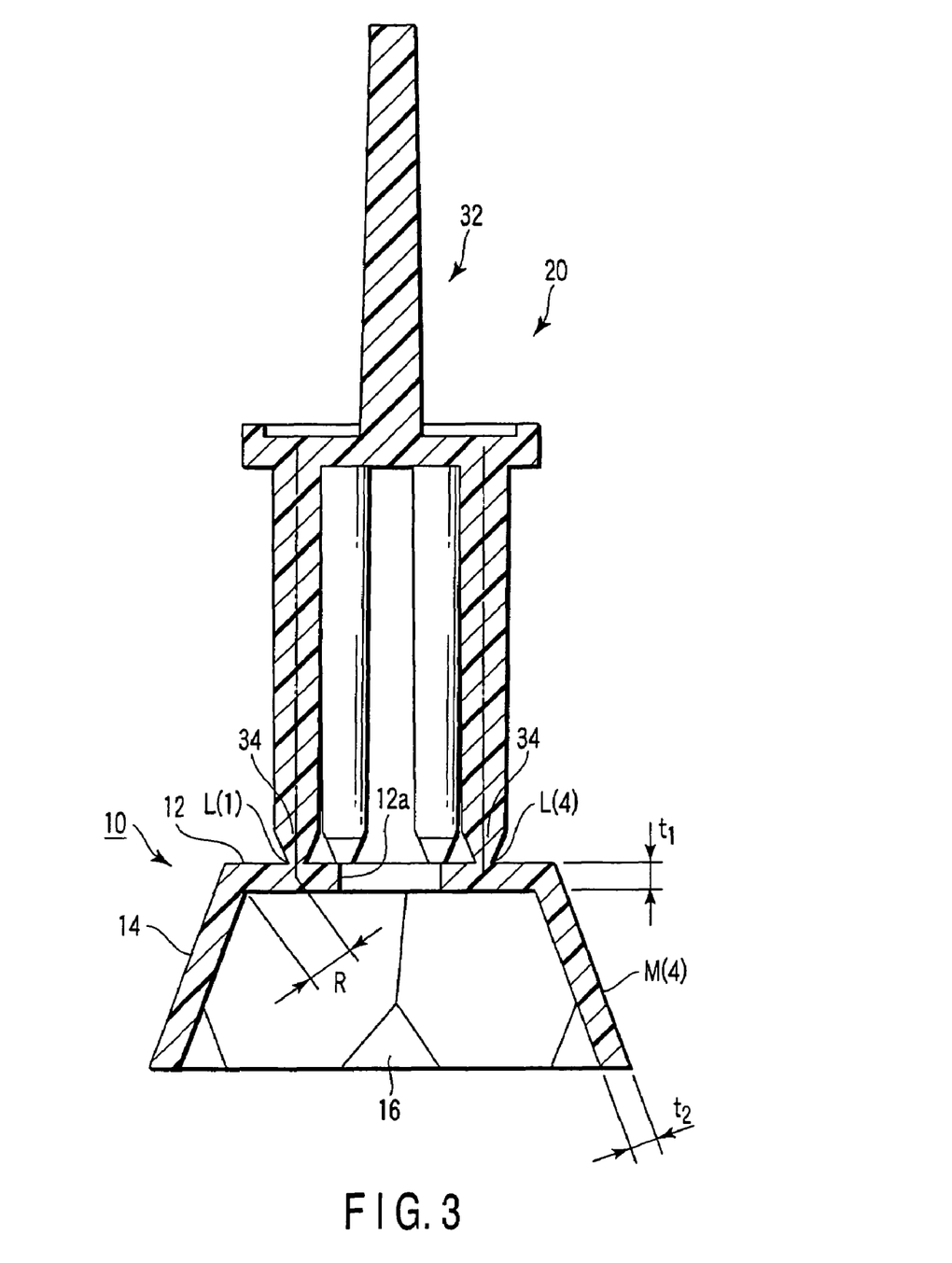
FIG. 3 is a schematic longitudinal sectional view of the molded piece of FIG. 2 for molding the polygon mirror according to the first embodiment.

As shown in FIG. 3, the central part of the flat portion 12 that shuts the upper end portion of, for example, the umbrella-shaped reflective surface group 14 is penetrated by a circular mounting hole 12a in its thickness direction. The polygon mirror 10 is mounted on the rotating body (not shown) in a manner such that a rotating shaft of the rotating body is passed through the mounting hole 12a. Rotating means (not shown), such as a motor, is incorporated in the rotating body. Accordingly, the rotating body can be rotated by driving this rotating means. Thus, as the rotating body rotates, the polygon mirror 10 rotates integrally with the rotating body, whereupon the aforesaid switching and scanning of the reflected light are carried out.

If the flat portion 12 can be mounted on the rotating body, the mounting hole 12a is unnecessary. For example, the polygon mirror 10 can be mounted on the rotating body by fastening the flat portion 12 to the rotating body with a plurality of screws (not shown) that penetrate the flat portion.

As mentioned before, the entire polygon mirror 10 is formed by injection molding. Gate portions 34 (mentioned later) for injecting the resin material into a die (not shown, having a shape for molding the polygon mirror 10) are located in positions opposite to the flat portion 12 of the polygon mirror 10. Thus, pin gate traces L(1), L(2), L(3), L(4), L(5) and L(6) of pin gates of the gate portions 34 are formed on the upper surface of the flat portion 12 of the polygon mirror 10.

The six pin gate traces L(1) to L(6) are arranged around the mounting hole 12a of the flat portion 12 so as to corresponding to the six reflective surfaces M(1) to M(6), respectively. The pin gate trace L(1) corresponds to the reflective surface M(1), while the pin gate trace L(2) corresponds to the reflective surface M(2). In the description to follow, parenthesized numerals successively correspond to the numerals that are used to designate the reflective surfaces.

As shown in FIGS. 2 and 3, a molded piece 20 including the polygon mirror 10 in the die is molded by injecting the molten resin material into the die. The die includes a sprue runner portion 32 corresponding to a sprue runner and the gate portions 34 corresponding to gates. The gate portions 34 are located individually near positions corresponding to the individual reflective surfaces M(1) to M(6). After the gate portions 34 are removed from the flat portion 12 of the polygon mirror 10, the respective distal end portions (lower end portions) of the gate portions 34 form the pin gate traces L(1) to L(6) of FIG. 1 corresponding to the reflective surfaces M(1) to M(6), respectively. The pin gate traces L(1) to L(6) are formed by the pin gates on the respective distal ends of the gate portions 34. In this embodiment, therefore, six pin gates, like the pin gate traces, are denoted by symbols L(1) to L(6), individually.

The following is a description of the dimensions of the polygon mirror 10 and the molding die for it.

Symbols DM(1), DM(2), DM(3), DM(4), DM(5) and DM(6) shown in FIG. 1 are defined individually as shortest distances, which resemble shortest distances R (FIG. 3) between the pin gate traces L(1) to L(6) and individual edges portions at which the respective reverse sides of the reflective surfaces M(1) to M(6) cross the flat portion 12.

Let it be supposed, on the other hand, that the shortest distance between the pin gate trace L(1) and the pin gate trace L(2) is DL(1) and the shortest distance between the pin gate trace L(2) and the pin gate trace L(3) is DL(2). In the description to follow, the shortest distance between each two adjacent pin gate traces will be described corresponding to the parenthesized numerals for the pin gate traces. Thus, the shortest distance between the pin gate trace L(5) and the pin gate trace L(6) is DL(5), while the shortest distance between the pin gate trace L(1) and the pin gate trace L(6) is DL(6).

If the shortest distances DM and DL are defined in this manner, the polygon mirror 10 is formed under set conditions DM(1)>DL(1)/2, DM(2)>DL(2)/2, DM(6)>DL(6)/2 and DM(1)>DL(n)/2, that is, DM(2)>DL(1)/2, ..., DM(6)>DL(5)/2, for example.

Preferably, moreover, the polygon mirror 10 is formed under set conditions DM(1)×1.1>DL(1)/2, DM(2)×1.1>DL(2)/2, ..., DM(6)×1.1>DL(6)/2 and DM(1)×1.1>DL(6)/2, DM(2)×1.1>DL(1)/2, DM(6)×1.1>DL(5)/2.

Thus, in the relationships set in this manner, the shortest distances DM(1) to DM(6) are shorter than half the shortest distances DL(1) to DL(6). Therefore, the shortest distance DM that is defined in the same manner as the aforesaid distance R is longer than half the shortest distance DL between each two adjacent pin gate traces L.

Since the shortest distances DM and DL are set in this manner, the resin material to be injection-molded flows together with the resin material injected through the adjacent pin gates L toward the reflective surfaces after coming into contact with it. Accordingly, weld lines can be prevented from being produced on the polygon mirror 10. Thus, the polygon mirror 10 can be formed having high surface accuracy and strength.

The aforesaid relationships are set in the same manner for the molding die for molding the polygon mirror 10. Let it be supposed that DM(1) is the shortest distance from the edge portion at which the reverse side of the reflective surface M(1) and the flat portion 12 cross each other to the pin gate L(1), DM(2) is the shortest distance from the edge portion at which the reverse side of the reflective surface M(2) and the flat portion 12 cross each other to the pin gate L(2), and DM(6) is the shortest distance from the edge portion at which the reverse side of the reflective surface M(6) and the flat portion 12 cross each other to the pin gate L(6). Let us suppose, moreover, that DL(1) is the shortest distance between the pin gate L(1) and the pin gate L(2), DL(2) is the shortest distance between the pin gate L(2) and the pin gate L(3), and DL(6) is the shortest distance between the pin gate L(1) and the pin gate L(6). In this case, the die used to mold the polygon mirror 10 is based on the conditions DM(1)>DL(1)/2, DM(2)>DL(2)/2, DM(6)>DL(6)/2 and DM(1)>DL(6)/2, DM(2)>DL(1)/2, ..., DM(6)>DL(5)/2.

Further preferably, in this case, the die used to mold the polygon mirror 10 is based on the conditions DM(1)×1.1>DL(1)/2, DM(2)×1.1>DL(2)/2, ..., DM(6)×1.1>DL(6)/2 and DM(1)×1.1>DL(6)/2, DM(2)×1.1>DL(1)/2, ..., DM(6)×1.1>DL(5)/2. Thus, the die is formed so as to meet the aforesaid conditions.

If the molding die of this type is used, therefore, the shortest distances DM(1) to DM(6) are shorter than half the shortest distances DL(1) to DL(6). Therefore, the shortest distance DM that is defined in the same manner as the aforesaid distance R is longer than half the shortest distance DL between each two adjacent pin gate traces L.

If the polygon mirror 10 is injection-molded with use of the die, with the shortest distances DM and DL set in this manner, the resin material injected through the pin gates flows together with the resin material injected through the adjacent pin gates L toward the reflective surfaces M after coming into contact with it. Accordingly, weld lines can be prevented from being produced on the polygon mirror 10. Thus, there is provided the die that can mold the polygon mirror 10 having high surface accuracy and strength.

The shortest distances DM(1) to DM(6) may be also defined in the following manner. The distance DM(1) is defined as the shortest distance from the edge portion at which the reflective surface M(1) and the flat portion 12 cross each other to the pin gate trace L(1), DM(2) is defined as the distance from the edge portion at which the reflective surface M(2) and the flat portion 12 cross each other to the pin gate trace L(2), and the pin gate traces L corresponding to the subsequent reflective surfaces are described corresponding to the parenthesized numerals. Thus, DM(6) is the shortest distance from the edge portion at which the reflective surface M(6) and the flat portion 12 cross each other to the pin gate L(6).

Each shortest distance DM defined in this manner is equivalent to the length of a perpendicular that extends from each pin gate trace L so as to be normal to the edge portion at which each reflective surface M and the flat portion 12 cross each other. This definition is not substantially different from the definition of the shortest distances DM(1) to DM(6) from the edge portions at which the respective reverse sides of the reflective surfaces M cross the flat portion 12 to each pin gate trace L, as mentioned before.

If the thickness of the flat portion 12 and the thickness of each of the reflective surfaces M(1) to M(6) are $t_1$ and $t_2$, respectively, as shown in FIG. 3, these thicknesses are set so that $0.7 \leq t_1/t_2 \leq 1.3$ is established. Further preferably, in this case, $0.85 \leq t_1/t_2 \leq 1.15$ is established. Preferably, the thicknesses $t_1$ and $t_2$ should be adjusted to 1 mm$\leq t_1 \leq$3 mm and 1 mm$\leq t_2 \leq$3 mm, respectively. Further preferably, 1.5 mm$\leq t_1 \leq$2.5 mm and 1.5 mm $t_2 \leq$2.5 mm should be given.

Since the thicknesses $t_1$ and $t_2$ and the ratio between them are set in this manner, the flow of the resin material is uniform, and weld lines can be prevented from being produced in the filled resin material. Thus, the polygon mirror 10 can be molded having high surface accuracy and strength.

The aforesaid relationships are set in the same manner for the molding die for molding the polygon mirror 10. Thus, if the thickness of the flat portion 12 and the thickness of each of the reflective surfaces M(1) to M(6) are $t_1$ and $t_2$, respectively, the die used is based on the condition given by $0.7 \leq t_1/t_2 \leq 1.3$. Preferably, in this case, the thicknesses $t_1$ and $t_2$ should be adjusted to 1 mm$\leq t_1 \leq$3 mm and 1 mm$\leq t_2 \leq$3 mm, respectively.

Figure 4:
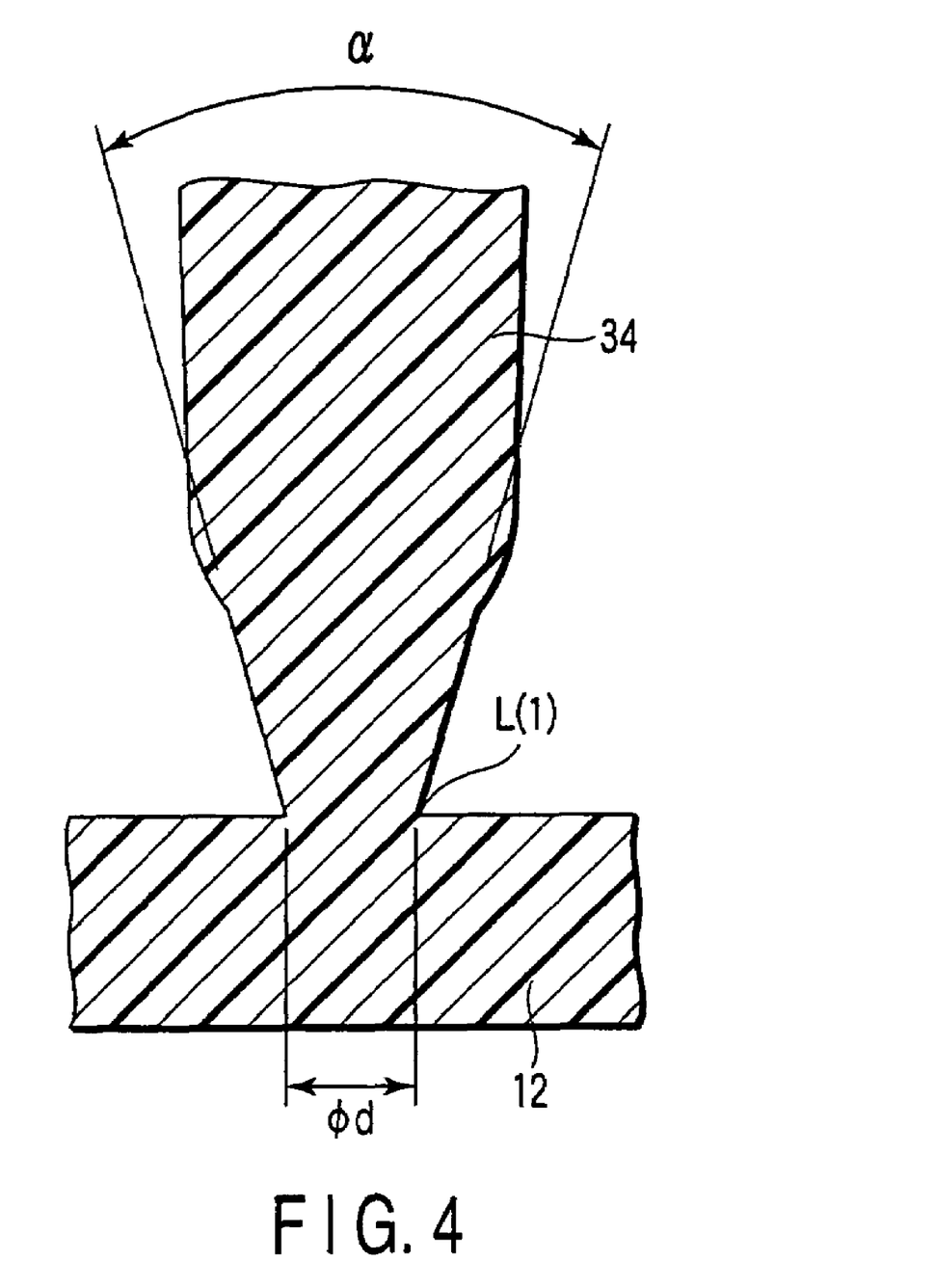
FIG. 4 is a schematic enlarged sectional view of a pin gate (shown in FIG. 3) of the polygon mirror according to the first embodiment.

FIG. 4 shows an enlarged sectional view of the pin gate L(1). This illustration is equally applicable to the other pin gates L(2) to L(6). If the diameter and opening angle of the pin gate L(1) are φd and α, respectively, 0.8 mm≦φd≦1.6 mm and 15°≦α≦35° should preferably be established.

If the diameter φd is less than 0.8 mm, the molten resin material cannot easily flow during injection molding operation, so that the polygon mirror 10 may undergo defective molding, such as short shots, sink marks. If the diameter φd exceeds 1.6 mm, release of the resin material from the gates L is not smooth, so that traces of the gates L inevitably remain long on the polygon mirror 10.

If the opening angle α is less than 15°, on the other hand, release of the resin material from the gates L is not smooth, so that traces of the gates L inevitably remain long on the polygon mirror 10. If the opening angle α exceeds 35°, the pin gates L easily wear as the molding is repeated.

Preferably, therefore, the diameter φd and opening angle α of the pin gates L should be within the aforesaid ranges of conditions.

Figure 5:
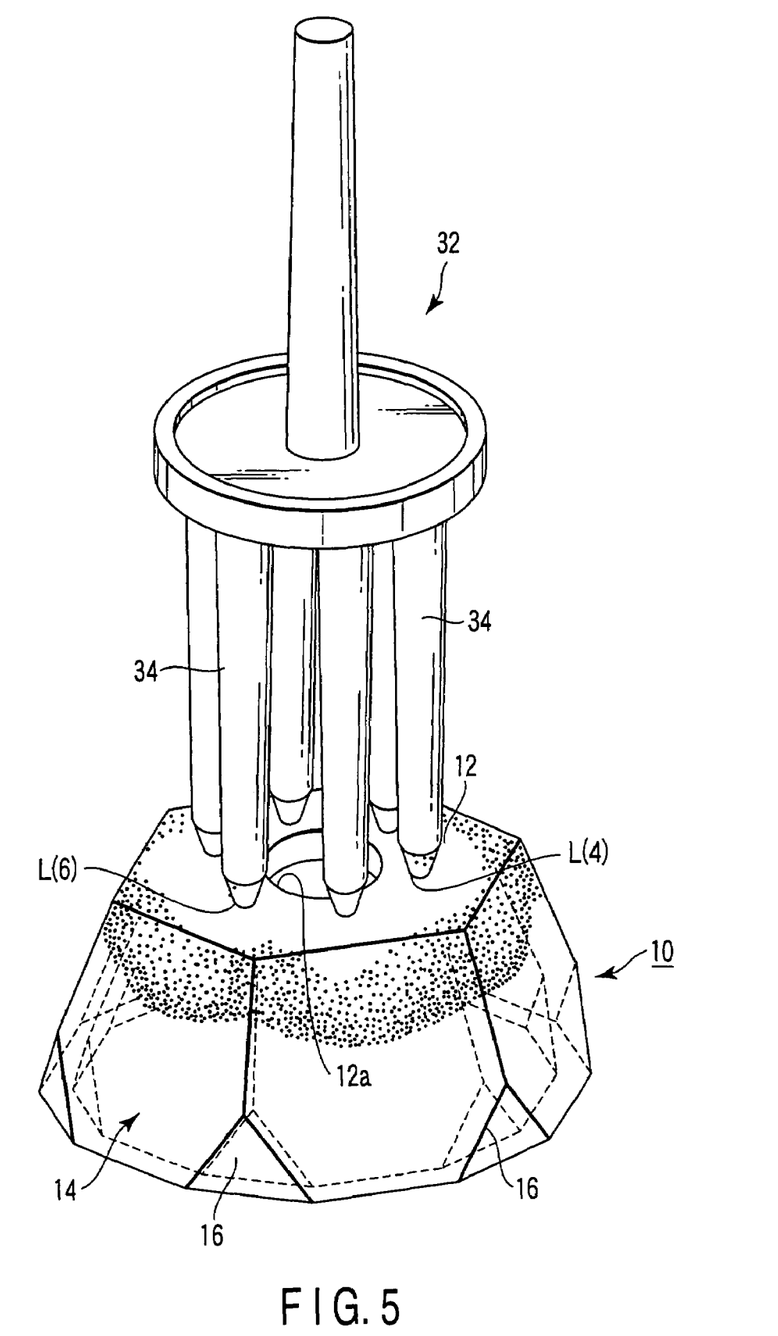
FIG. 5 is a schematic perspective view showing the way a resin material flows as the polygon mirror according to the first embodiment is molded.

FIG. 5 shows a state in which the molten resin material is injection-molded according to the aforesaid conditions. No weld lines are produced on the adjacent reflective surfaces M. This is because the resin materials that are injected through the adjacent pin gates L touch and join with each other and then flow to mold the reflective surfaces M, as mentioned before.

According to this embodiment, as described above, conditions are given as follows.

The shortest distances from the sides (edges portions) at which the reflective surfaces M(1), M(2), . . . , M(6) cross the flat portion 12 to the pin gate traces L(1), L(2), . . . , L(6) are shorter than half the shortest distances between the pin gate traces adjacent to them. Thus, the shortest distances from the portions at which the reflective surfaces M(1), M(2), . . . , M(6) cross the flat portion 12 to the pin gate traces L(1), L(2), . . . , L(6) are longer than half the shortest distances between the pin gate traces. With these set values, the injection-molded resin material touches and then flow together with the resin material from the adjacent pin gates L(1), L(2), . . . , L(6) toward the reflective surfaces M(1), M(2), . . . , M(6), so that weld lines can be prevented from being produced. Accordingly, the polygon mirror 10 can be formed having high surface accuracy and strength. Since the polygon mirror 10 with high surface accuracy is formed in this manner, it can be mounted satisfactorily on the rotating body. Thus, there may be provided the high-durability polygon mirror 10 that can be suitably used even under severe environment, such as vehicular conditions including high temperature, low temperature, high humidity, etc.

Since the thickness $t_1$ of the flat portion 12 and the thickness $t_2$ of the reflective surfaces M(1), M(2), . . . , M(6) are set so that the relation $0.7 \leq t_1/t_2 \leq 1.3$ is established, the flow of the resin material is uniform. Accordingly, weld lines can be prevented from being produced in the filled resin material. Thus, the polygon mirror 10 can be formed having high surface accuracy and strength.

Further, no pin gates L are arranged in the region where the mounting hole 12a is formed. Therefore, the mounting hole 12a for the rotating body can be formed with high accuracy. Thus, the mounting hole 12a can be easily fitted on the rotating body.

Figure 6:
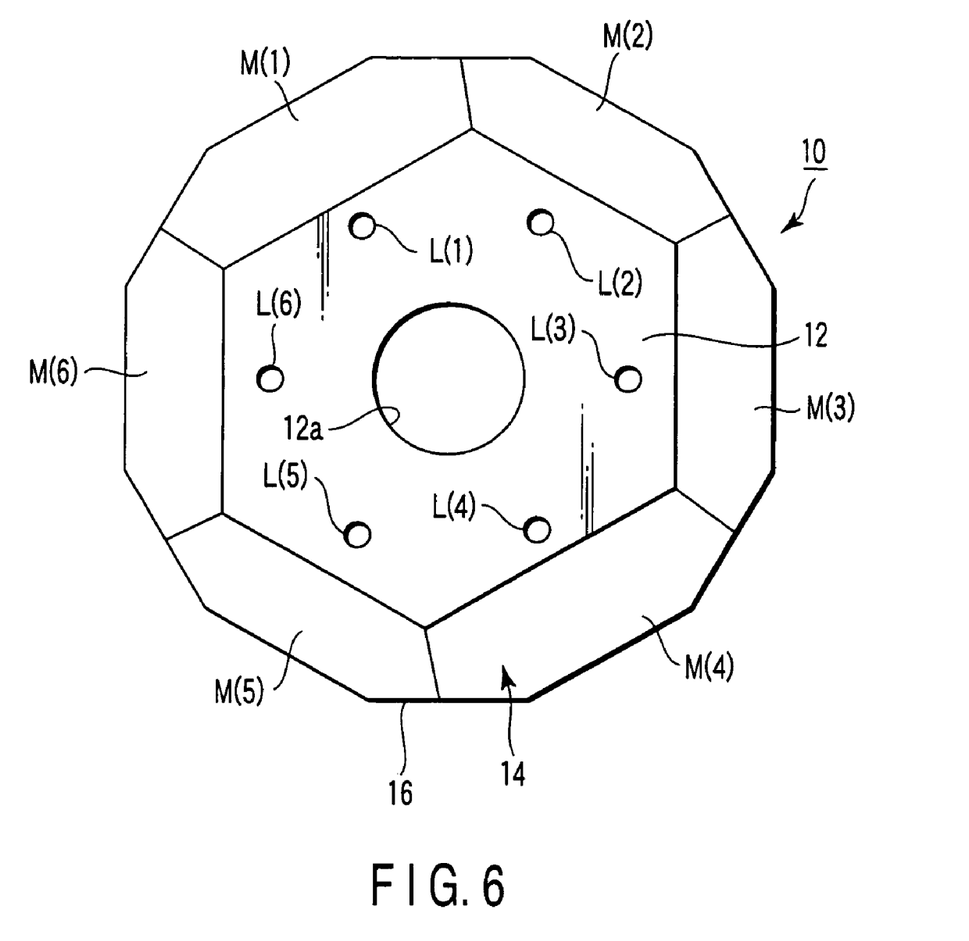
FIG. 6 is a schematic plan view showing a case where the polygon mirror according to the first embodiment has unfavorable pin gate traces.
Figure 7:
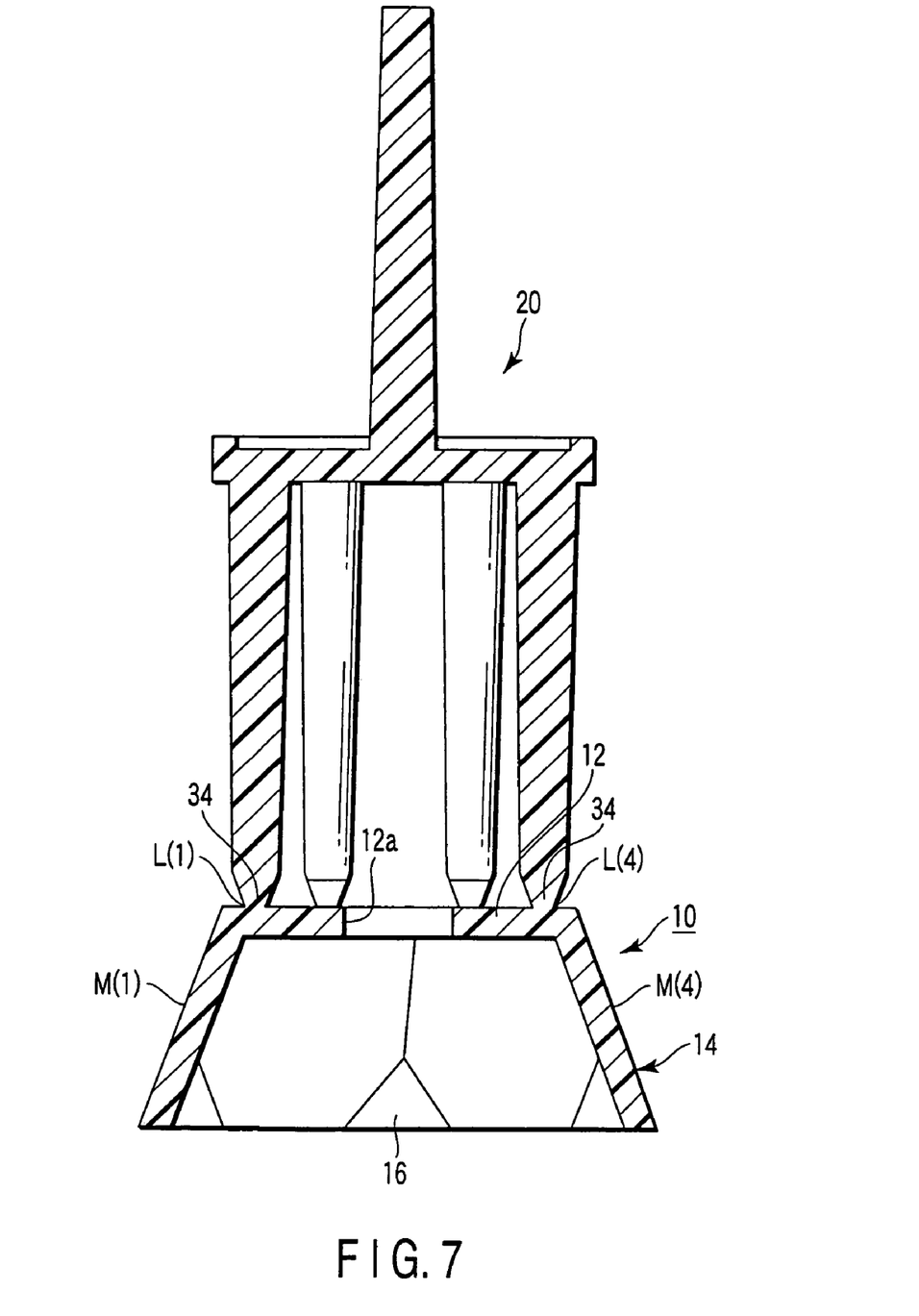
FIG. 7 is a longitudinal sectional view of a molded piece for molding the unfavorable polygon mirror of FIG. 6 according to the first embodiment.

FIG. 6 shows the polygon mirror that is molded without meeting the conditions described in connection with the first embodiment. FIG. 7 shows a molded piece including the polygon mirror.

As shown in FIGS. 6 and 7, the pin gate traces L(1) to L(6) (like the pin gates L(1) to L(6)) are formed in positions very close to the edge portions at which the reflective surfaces M(1) to M(6) cross the flat portion 12. Thus, the shortest distances DM are shorter than the shortest distances DL between the adjacent pin gate traces L(1) to L(6).

Figure 8:
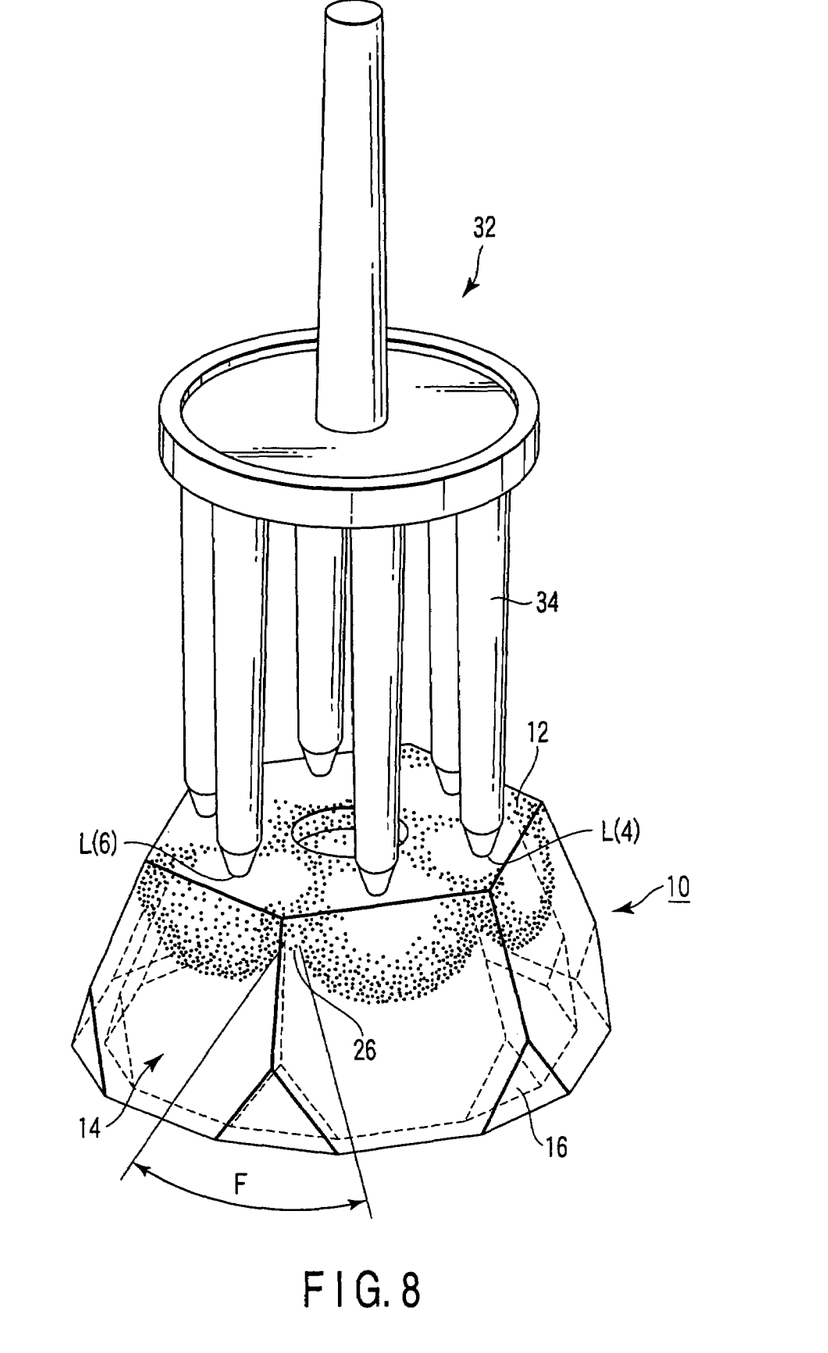
FIG. 8 is a schematic perspective view showing the way the resin material flows as the unfavorable polygon mirror according to the first embodiment is molded.

FIG. 8 shows the polygon mirror that is injection-molded under the conditions shown in FIGS. 6 and 7. As shown in FIG. 8, weld lines 26 are produced individually at boundary portions between the reflective surfaces M(1) to M(6). They are produced because the injected resin material flows so that each reflective surface M is molded before it touches the resin material from each adjacent pin gate L. In other words, the reason is that a meeting angle F at which the resin materials that are injected through the adjacent pin gates L touch each other is small. The larger the meeting angle F, the more favorable the result.

Figure 9:
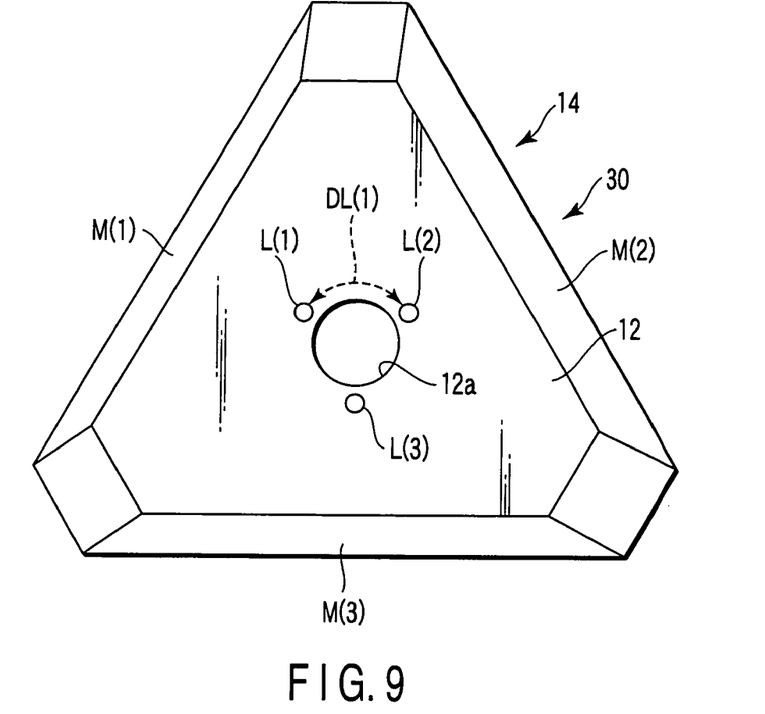
FIG. 9 is a schematic plan view showing a polygon mirror according to a second embodiment of the present invention.

A second embodiment will now be described with reference to FIG. 9. This embodiment is a modification of the first embodiment. Therefore, like numerals are used to designate the same members as the ones described in connection with the first embodiment and those members that have the same functions, and a detailed description of those members is omitted.

A polygon mirror 30 according to this embodiment includes a tubular reflective surface group 14, of which three reflective surfaces M(1), M(3) and M(3) are formed individually as outer peripheral side faces, and a substantially triangular flat portion 12 that shuts the upper end portion of the reflective surface group 14. The reflective surface group 14 is formed substantially in the shape of a prism.

The polygon mirror 30 is also molded by injecting a molten resin material. Pin gate traces (or pin gates of a die) L(1), L(2) and L(3) for injection molding are arranged so as to correspond to the reflective surfaces M(1), M(2) and M(3), respectively.

The pin gate traces L(1), L(2) and L(3) are arranged around a mounting hole 12a that is formed in the flat portion 12. In this case, a shortest distance DL between each two adjacent pin gate traces L, e.g., a shortest distance DL(1) between the pin gate trace L(1) and the pin gate trace L(2), is defined by a circular locus that is concentric with the circular mounting hole 12a.

The shortest distance DL is defined in this manner, and a shortest distance DM (not shown) from the edge portion at which each reflective surface M and the flat portion 12 cross each other to each pin gate L is defined in the same manner as in the first embodiment. Further, the relationship between these shortest distances DM and DL is set in the same manner as in the first embodiment. Thereupon, weld lines cannot be easily produced during injection molding operation, so that the polygon mirror 30 can be formed having high surface accuracy and strength. Since weld lines cannot be easily produced during injection molding operation, moreover, there may be provided a die that can mold the polygon mirror 30 with high surface accuracy and strength.

If n number of reflective surfaces M are used in this embodiment, the effects as the ones described in connection with the first embodiment can be obtained by setting conditions DM(1)>DL(1)/2, DM(2)>DL(2)/2, . . . , DM(n)>DL(n)/2 and DM(1)>DL(n)/2, DM(2)>DL(1)/2, . . . , DM(n)>DL(n−1)/2.

Although some embodiments have been specifically described herein with reference to the drawings, this invention is not limited to these embodiments, but encompasses any and all embodiments within the scope of the invention.

What is claimed is:

1. A polygon mirror comprising:
   a reflective surface group having n number of reflective surfaces (M(1), M(2), . . . , M(n)) formed individually as outer peripheral side faces;
   a flat portion which shuts one end portion of the reflective surface group; and n number of pin gate traces (L(1), L(2), , L(n)) which are provided on the flat portion and which correspond respectively to the n number of reflective surfaces, each of the pin gate traces being at a distance from an edge portion at which the reflective surface corresponding thereto crosses the flat portion, wherein the polygon mirror satisfies the following conditions:

$DM(1) > DL(1)/2, DM(2) > DL(2)/2, \ldots, DM(n) > DL(n)/2$; and $DM(1) > DL(n)/2, DM(2) > DL(1)/2, \ldots, DM(n) > DL(n-1)/2$, where DM(1) is a shortest distance from the edge portion at which the reflective surface M(1) and the flat portion cross each other to the pin gate trace L(1), DM(2) is a shortest distance from the edge portion at which the reflective surface M(2) and the flat portion cross each other to the pin gate trace L(2), . . . , and DM(n) is a shortest distance from the edge portion at which the reflective surface M(n) and the flat portion cross each other to the pin gate trace L(n), and where DL(1) is a shortest distance between the pin gate trace L(1) and the pin gate trace L(2), DL(2) is a shortest distance between the pin gate trace L(2) and the pin gate trace L(3), . . . , and DL(n) is a shortest distance between the pin gate trace L(n) and the pin gate trace L(1).

2. A polygon mirror according to claim 1, wherein each said edge portion is a portion at which a reverse side of one of the reflective surfaces on a reverse side of the reflective surface group and a reverse side of the flat portion cross each other.

3. A polygon mirror according to claim 2, wherein the reflective surface group is formed in the shape of an umbrella on the flat portion.

4. A polygon mirror according to claim 2, wherein the reflective surface group is formed in the shape of a tubular prism.

5. A polygon mirror according to claim 1, wherein the reflective surface group is formed in the shape of an umbrella on the flat portion.

6. A polygon mirror according to claim 1, wherein the reflective surface group is formed in the shape of a tubular prism.

7. A polygon mirror according to claim 1, wherein the polygon mirror satisfies the condition:

$0.7 \leq t_1/t_2 \leq 1.3$ where $t_1$ is a thickness of the flat portion, and $t_2$ is a thickness of each said reflective surface.

8. A polygon mirror according to claim 7, wherein the reflective surface group is formed in the shape of an umbrella on the flat portion.

9. A polygon mirror according to claim 7, wherein the reflective surface group is formed in the shape of a tubular prism.

10. A polygon mirror according to claim 7, wherein the polygon mirror satisfies the condition:

$0.85 \leq t_1/t_2 \leq 1.15$.

11. A polygon mirror comprising:
a reflective surface group having n number of reflective surfaces (M(1), M(2), . . . , M(n)) formed individually as outer peripheral side faces;
a flat portion which shuts one end portion of the reflective surface group; and n number of pin gate traces (L(1), L(2), . . . , L(n)) which are provided on the flat portion and which correspond respectively to the n number of reflective surfaces, each of the pin gate traces being at a distance from an edge portion at which the reflective surface corresponding thereto crosses the flat portion, wherein the polygon mirror satisfies the following conditions:

$DM(1) \times 1.1 > DL(1)/2, DM(2) \times 1.1 > DL(2)/2, \ldots, DM(n) \times 1.1 > DL(n)/2$; and $DM(1) \times 1.1 > DL(n)/2, DM(2) \times 1.1 > DL(1)/2, \ldots, DM(n) \times 1.1 > DL(n-b\ 1)/2$, where DM(1) is a shortest distance from the edge portion at which the reflective surface M(1) and the flat portion cross each other to the pin gate trace L(1), DM(2) is a shortest distance from the edge portion at which the reflective surface M(2) and the flat portion cross each other to the pin gate trace L(2), . . . , and DM(n) is a shortest distance from the edge portion at which the reflective surface M(n) and the flat portion cross each other to the pin gate trace L(n), and where DL(1) is a shortest distance between the pin gate trace L(1) and the pin gate trace L(2), DL(2) is a shortest distance between the pin gate trace L(2) and the pin gate trace L(3), . . . , and DL(n) is a shortest distance between the pin gate trace L(n) and the pin gate trace L(1).

12. A polygon mirror comprising:
a mounting surface mounted on a rotating body;
n number of reflective surfaces (M(1), M(2), . . . , M(n)) molded integrally with the mounting surface and arranged around the rotating body so as to surround the rotating body; and
n number of pin gate traces (L(1), L(2), . . . , L(n)) which are provided on the mounting surface and which correspond respectively to the n number of reflective surfaces, each of the pin gate traces being at a distance from an edge at which the reflective corresponding thereto crosses cross the mounting surface, wherein the polygon mirror satisfies the following conditions:

$DM(1) > DL(1)/2, DM(2) > DL(2)/2, \ldots, DM(n) > DL(n)/2$; and $DM(1) > DL(n)/2, DM(2) > DL(1)/2, \ldots, DM(n) > DL(n-1)/2$, where DM(1) is a shortest distance from the edge portion at which the reflective surface M(1) and the mounting surface cross each other to the pin gate trace L(1), DM(2) is a shortest distance from the edge portion at which the reflective surface M(2) and the mounting surface cross each other to the pin gate trace L(2), . . . , and DM(n) is a shortest distance from the edge portion at which the reflective surface M(n) and the mounting surface cross each other to the pin gate trace L(n), and where DL(1) is a shortest distance between the pin gate trace L(1) and the pin gate trace L(2), DL(2) is a shortest distance between the pin gate trace L(2) and the pin gate trace L(3), . . . , and DL(n) is a shortest distance between the pin gate trace L(n) and the pin gate trace L(1).

13. A polygon mirror molding die for molding a polygon mirror that comprises a reflective surface group having n number of reflective surfaces (M(1), M(2), . . . , M(n)) formed individually as outer peripheral side faces and a flat portion which shuts one end portion of the reflective surface group, the polygon mirror molding die comprising:

n number of pin gates (L(1), L(2), ..., L(n)) which are provided on a flat portion molding surface for molding the flat portion, and which correspond respectively to the n number of reflective surfaces, each of the pin gates being at a distance from an edge portions at which the reflective surface corresponding thereto the flat portion, wherein the following conditions are satisfied:

$$DM(1)>DL(1)/2, DM(2)>DL(2)/2, \ldots, DM(n)>DL(n)/2; \text{ and}$$

$$DM(1)>DL(n)/2, DM(2)>DL(1)/2, \ldots, DM(n)>DL(n-1)/2,$$

where DM(1) is a shortest distance from the edge portion at which the reflective surface M(1) and the flat portion cross each other to the pin gate L(1), DM(2) is a shortest distance from the edge portion at which the reflective surface M(2) and the flat portion cross each other to the pin gate L(2), ..., and DM(n) is a shortest distance from the edge portion at which the reflective surface M(n) and the flat portion cross each other to the pin gate L(n), and where DL(1) is a shortest distance between the pin gate L(1) and the pin gate L(2), DL(2) is a shortest distance between the pin gate L(2) and the pin gate L(3), ..., and DL(n) is a shortest distance between the pin gate L(n) and the pin gate L(1).

14. A polygon mirror molding die according to claim 13, wherein each said edge portion is a portion at which a reverse side of one of the reflective surfaces on a reverse side of the reflective surface group and a reverse side of the flat portion cross each other.

15. A polygon mirror molding die according to claim 13, wherein the following condition is satisfied:

$$0.7 \leq t_1/t_2 \leq 1.3$$

where $t_1$ is a thickness of the flat portion, and $t_2$ is a thickness of each said reflective surface.

16. A polygon mirror molding die according to claim 15, wherein the following condition is satisfied:

$$0.85 \leq t_1/t_2 \leq 1.15.$$

17. A polygon mirror molding die for molding a polygon mirror that comprises a reflective surface group having n number of reflective surfaces (M(1), M(2), ..., M(n)) formed individually as outer peripheral side faces and a flat portion which shuts one end portion of the reflective surface group, the polygon mirror molding die comprising:

n number of pin gates (L(1), L(2), , L(n)) which are provided on a flat portion molding surface for molding the flat portion, and which correspond respectively to the n number of reflective surfaces, each of the pin gates being at a distance from an edge portions at which the reflective surface corresponding thereto the flat portion, wherein the following conditions are satisfied:

$$DM(1) \times 1.1 > DL(1)/2, DM(2) \times 1.1 > DL(2)/2, \ldots, DM(n) \times 1.1 > DL(n)/2; \text{ and}$$

$$DM(1) \times 1.1 > DL(n)/2, DM(2) \times 1.1 > DL(1)/2, \ldots, DM(n) \times 1.1 > DL(n-1)/2,$$

where DM(1) is a shortest distance from the edge portion at which the reflective surface M(1) and the flat portion cross each other to the pin gate L(1), DM(2) is a shortest distance from the edge portion at which the reflective surface M(2) and the flat portion cross each other to the pin gate L(2), ..., and DM(n) is a shortest distance from the edge portion at which the reflective surface M(n) and the flat portion cross each other to the pin gate L(n), and where DL(1) is a shortest distance between the pin gate L(1) and the pin gate L(2), DL(2) is a shortest distance between the pin gate L(2) and the pin gate L(3), ..., and DL(n) is a shortest distance between the pin gate L(n) and the pin gate L(1).

* * * * *